No. 853,531. PATENTED MAY 14, 1907.
R. H. BROWN.
CAR TRUCK.
APPLICATION FILED AUG. 27, 1906.
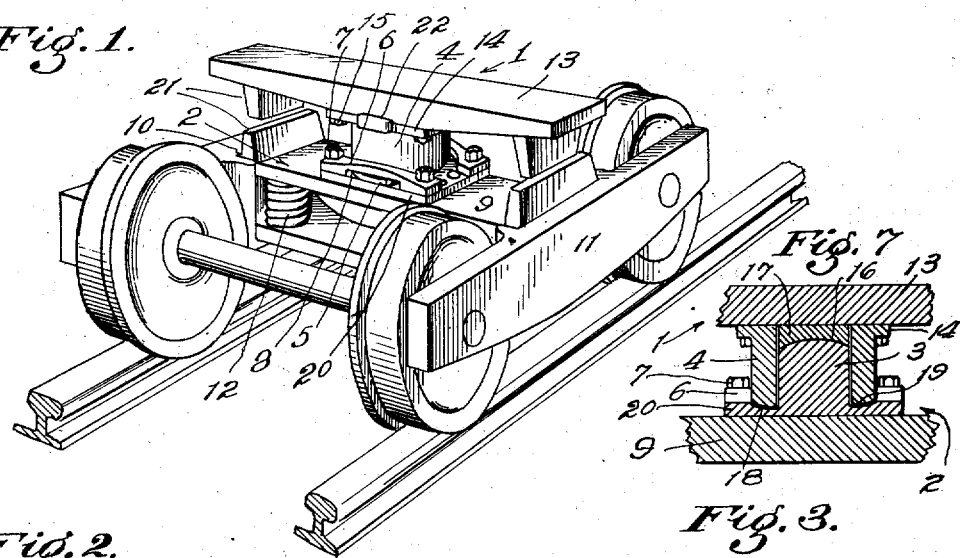
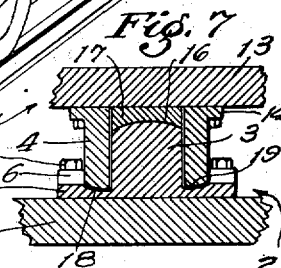
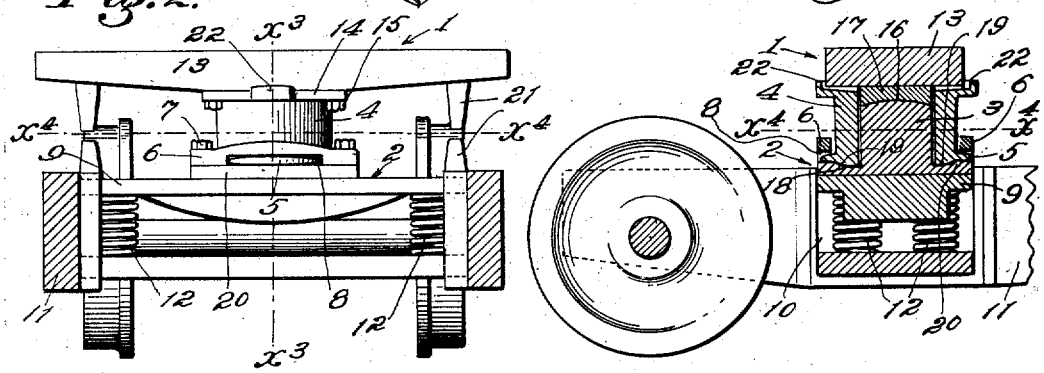
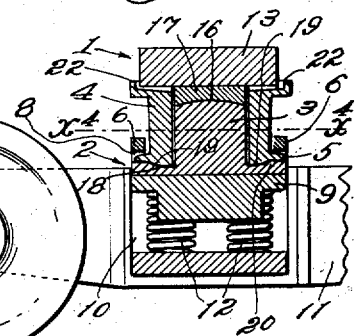
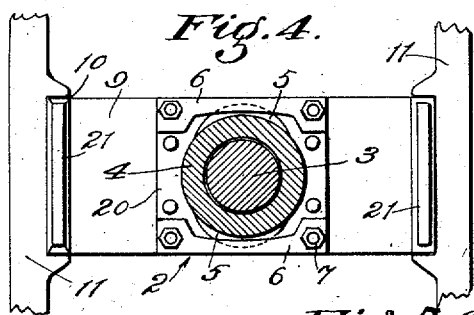
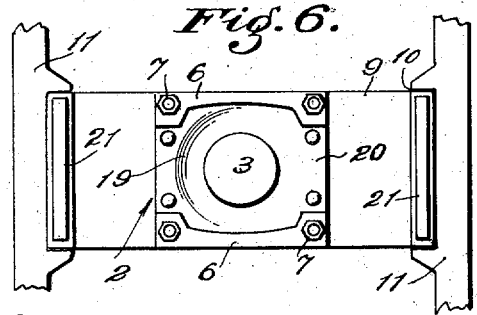
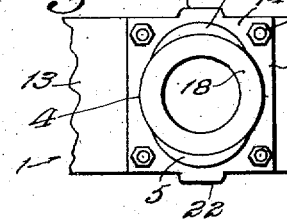
Witnesses
C. C. Holly
J. Townsend
Inventor
Robert H. Brown.
by James R Townsend
his atty

UNITED STATES PATENT OFFICE.

ROBERT H. BROWN, OF LOS ANGELES, CALIFORNIA, ASSIGNOR OF ONE-FOURTH TO DANIEL P. McMAHON, OF LOS ANGELES, CALIFORNIA.

CAR-TRUCK.

No. 853,531.　　　　Specification of Letters Patent.　　　　Patented May 14, 1907.

Application filed August 27, 1906. Serial No. 332,297.

*To all whom it may concern:*

Be it known that I, ROBERT H. BROWN, a citizen of the United States, residing at Los Angeles, in the county of Los Angeles and State of California, have invented new and useful Improvements in Car-Trucks, of which the following is a specification.

This invention relates to improvements on the inventions heretofore made by me and shown and described in two certain applications for patents filed in the United States Patent Office as follows:—(1)—Sectional king bolt for railway cars, Serial No. 303,778, filed March 2, 1906; and (2)—sectional king bolt for railway cars, Serial Number 322,771, filed June 21, 1906; and in which applications I have shown a sectional king-bolt connecting the car beam and truck beam of a railway car.

Objects of this invention are: to simplify and reduce the number of parts and to dispense with parts which might interfere with the application of the invention to car trucks of the ordinary construction; to make the device more readily applicable to cars; to provide for readily detaching the trucks from the car body; to provide a simple and effective pivotal connection between the car body and car truck, which will allow the necessary movements of the car truck caused by the angularities or curves of the track, without transmitting to the car body such movements of the truck; at the same time making provision for the ready and direct transmission of the tractive force either from the car body to the car truck or from the car truck to the car body, as the case may be for self-propelled or drawn cars; to provide for readily oiling the pivotal connection between the car body and the car truck.

By means of this invention the car truck is always freely pivoted to the car body, and all danger of jamming the pivotal connection, so that the trucks will not move freely around a curve, is entirely done away with.

An object of this invention is to provide a safe strong coupling between the car body and truck that will do away with all liability of lifting any of the wheels of the truck off the ground in case the car body is brought to an angle with the track as occurs when a tram car starts to climb a steep hill.

A principle of my invention with regard to one of its features of novelty is that a solid stud is used as the bottom section of the king bolt and the same engages the inside of a socket formed by a collar, an annular end of which engages the base of the bottom section, and peripheral means are employed to hold the parts together, thereby allowing the stud and the collar to form solid continuous bearing faces from side to side and allowing such bearing faces to be curved to allow the requisite rocking movement between the parts to give the required flexible joint.

The accompanying drawings illustrate the invention.

Figure 1 is a fragmental, perspective view of a railway car embodying this invention. Fig. 2 is a broken sectional elevation of the same cutting through the truck frame rearwardly of the front wheels. Fig. 3 is a section on line $x^3$, Fig. 2. Fig. 4 is a plan on line $x^4$, Figs. 2 and 3. Fig. 5 is a broken view of the upper pivotal member inverted. Fig. 6 is a view of the lower pivotal member in normal position. Fig. 7 is a fragmental axial section at right angles to the sectional plane of Fig. 2.

1 and 2 designate two superposed pivotal members, one comprising a center pin 3 and the other a seat in the form of a collar 4. Peripheral interlocking means are provided connecting said members together. Said means shown in the drawings comprise shoulders in the form of lugs or flanges 5 on the front and rear of the collar 4 and detachable bars 6 fixed to the lower pivotal member by means of nuts and bolts 7 and forming ways 8 on the lower pivotal member for the shoulders or lugs.

9 is a truck beam mounted in ways 10 in the truck frame 11 and supported by springs 12.

13 is the car beam or bolster. The upper pivotal member 1 may be regarded as including the car beam 13, a plate 14 fastened thereto by any suitable means, as bolts 15, and the collar 4. Said collar fits the center-pin 3 loosely so as to allow for a rocking motion between the car truck and the body of the car. The upper end 16 of the center-pin 3 is preferably rounded and may be provided with a shim 17 which forms a continuation of said pivot to be engaged by the pin-seat or collar 4, which collar is rounded at the lower end 18 to engage a concaved or curved seat 19 in the plate 20 to which the center-pin is attached. The ways 8 for the shoulders or lugs may be formed, as shown, by detachable bars 6 fastened to the lower plate 20 and parallel with each other at the opposite front and rear sides of said pin.

21 designates stops at the ends of the truck-beam 9 and car beam 13 to limit the lateral rocking of the trucks relative to the car body.

22 indicates cups and ways at the top of the column or pin-seat through which lubrication for the pin may be constantly supplied.

In practical operation, assuming that the traction is applied to the car body, the effect will be to push forward on the center pin by means of the collar 4. Perfect freedom for rotary movement between the truck and the car is allowed without any danger of jamming the king-bolt and preventing the necessary turning of the trucks in going around curves. By removing the detachable bars 6 and supporting the car body, the car truck can be readily removed.

The beams 9 and 13 and other parts may be made of any suitable material, preferably wrought, rolled, or cast steel or iron. The beam and collar fastened thereto form a seat for the rounded end of the pin to allow the pin to sway relative to the beam and collar. The seat for the pin engages or rests on the lower member at back and front of the pin 3, as seen at 5 in Figs. 1 and 2 where the bottom of the flange or lug 5 is rounded in cross section to rock on the lower member 20. The shim extension 17 of the pin enables the attendant to make good any wear by substituting thicker shims as the wear occurs, thus to cause the upper pivotal member to be mainly supported by the pin.

The two bars 6 shown in Figs. 4, 5, and 6 are employed for maximum security and strength, but one of them alone will serve to prevent separation of the sections 3 and 4 and in some cases one of such bars may be dispensed with.

What I claim is:—

1. A car truck comprising a car beam, a truck beam, a sectional king bolt between said beams, and peripheral means for holding the sections of the king bolt together.

2. A car truck comprising a car beam, a truck beam, a sectional king bolt between said beams, and peripheral means for detachably holding the sections of the king bolt together.

3. Two beams, a sectional pivot between said beams, one section being fixed to one beam and the other section fixed to the other beam, and peripheral means for holding the sections of the king bolt together.

4. A pivot comprising a center pin and a collar, and peripheral interlocking means holding said pin and collar together.

5. Two beams, a collar fastened to one of the beams and provided with lugs, a center pin in said collar fastened to the other beam, and guards on the last-named beam to engage said lugs to hold the parts together.

6. A car truck comprising a frame forming a vertical guide-way, springs on the frame, a beam on the springs in the guide-way, another beam, a pin and a collar,—one within the other,—one being fastened to one beam and the other to the other beam, and means for holding the pin and collar loosely together.

7. A sectional pivot comprising a pin and a hollow seat therefor, two beams, one fastened to the pin and the other to said seat, and peripheral means loosely connecting the pin and seat together.

8. A pivotal member provided with a pin and two ways one on each side of the pin, a pivotal member provided with a hollow seat forming a collar around the pin and having lugs to fit in said ways.

9. A truck comprising two beams, a sectional pivot comprising a pin and a collar therefor fastened to the beams respectively, said collar being provided with shoulders; and bars detachably connected with the pin to engage the shoulders to form ways therefor to allow partial rotation.

10. A sectional king bolt comprising a base plate, a pin thereon, ways at front and rear of said pin, a collar on the plate and surrounding the pin and provided with lugs in said ways.

11. A sectional king bolt comprising a base plate, a pin thereon, ways at front and rear of said pin, a collar on the plate and surrounding the pin and provided with lugs in said ways, the lower end of the collar being convex.

12. A pivotal member comprising a collar forming a seat for a pin, and provided at the upper end with oil-ways leading to the interior of the collar to engage the seat, and means loosely holding the pin and collar together.

13. A plate provided with a pin, such pin having a rounded end, and a concave seat around the pin, a collar around the pin provided with a rounded end in said concave seat and also provided with a seat for the rounded end of the pin.

14. A plate provided with a pin and a concave seat around the pin, said pin having a rounded end, a collar around the pin provided with a rounded end in said concave seat and also provided with a seat for the rounded end of the pin, and means for detachably fastening the plate and collar loosely together.

15. Two superposed beams, a sectional pivot between the beams, stops between the beams, said pivot and stops being constructed to allow rotary and rocking motion of said beams relative to each other, a truck frame provided with a vertical way for the lowermost of said beams, and springs supporting said lower beam in said way.

16. A car truck comprising two superposed beams, a solid pin fastened to the upper side of the lower beam, and a collar fastened to the under side of the upper beam and surrounding the pin and forming a seat thereon.

17. A car truck comprising two superposed beams, a solid pin fastened to the upper side of the lower beam, a collar fastened to the under side of the upper beam and surrounding the pin and forming a seat thereon, and means loosely fastening the pin and collar together.

18. A car truck comprising two superposed pivotal members, a pin fastened to and projecting up from the lower member, and a seat for said pin fastened to the upper member and resting on the lower member in front of said pin.

19. Two superposed pivotal members, a pin extending up from the lower member, a seat for said pin down from the upper member and engaging the lower member in front of said pin, and means detachably fastening the seat and the pin loosely together.

20. Two pivotal members, one comprising a center pin and the other a collar, and peripheral interlocking means loosely connecting said members together.

21. A truck beam, a car beam, a solid center pin connected with one of said beams, a collar connected with the other beam, and means loosely connecting said collar and pin.

22. Two pivotal members, one comprising a center pin with shim extension, and the other a collar surrounding the pin, and peripheral interlocking means to hold the pivotal members together.

23. Two pivotal members, a pin extending from one and provided with a shim extension, and a seat for said pin engaging the lower member at front and back of the pin.

In testimony whereof, I have hereunto set my hand at Los Angeles California this 17th day of August 1906.

ROBERT H. BROWN.

In presence of—
JAMES R. TOWNSEND,
JULIA TOWNSEND.